United States Patent [19]

Smith, Jr. et al.

[11] 4,439,676
[45] Mar. 27, 1984

[54] NATURAL GAMMA RAY LOGGING WITH BOREHOLE EFFECT COMPENSATION

[75] Inventors: Harry D. Smith, Jr.; Dan M. Arnold, both of Houston, Tex.

[73] Assignee: Texaco Inc., White Plains, N.Y.

[21] Appl. No.: 270,937

[22] Filed: Jun. 5, 1981

[51] Int. Cl.³ .............................................. G01V 5/00
[52] U.S. Cl. ...................................... 250/256; 250/262
[58] Field of Search ..................... 250/253, 256, 262; 73/152

[56] References Cited

U.S. PATENT DOCUMENTS

| | | | |
|---|---|---|---|
| 3,940,610 | 2/1976 | Dennis et al. | 250/262 |
| 3,976,878 | 8/1976 | Chevalier et al. | 250/253 |
| 4,187,908 | 2/1980 | Fertl et al. | 250/256 |
| 4,271,356 | 6/1981 | Groeschel et al. | 250/262 |

Primary Examiner—Janice A. Howell
Attorney, Agent, or Firm—Robert A. Kulason; Ronald G. Gillespie

[57] ABSTRACT

A natural gamma ray logging system utilizes gamma ray spectroscopy to measure thorium, uranium and potassium content of earth formations adjacent a well borehole. An additional measurement is also taken from which compensation for borehole effects on the measurements of interest is achieved.

14 Claims, 2 Drawing Figures

NATURAL GAMMA RAY LOGGING WITH BOREHOLE EFFECT COMPENSATION

BACKGROUND OF INVENTION

1. Field of Invention

The present invention relates to natural gamma ray logging in well boreholes.

2. Description of Prior Art

Prior efforts, such as in U.S. Pat. Nos. 3,940,610 and 3,976,878 have used natural gamma ray logging to measure the content of thorium, uranium and potassium (or daughter products of these elements) of earth formations adjacent well boreholes for study of characteristics of the formation. It was recognized that the measurement of uranium gamma ray energy at a window or energy range containing the 1.76 MeV uranium gamma ray energy peak was affected by gamma radiation from thorium in the formation, while the measurement of potassium gamma ray energy at a window containing the 1.46 MeV potassium gamma ray energy peak was affected by gamma radiation from both thorium and uranium in the formation. To compensate for this, factors known as stripping constants were obtained from measurements taken from test formation samples of known elemental concentrations. The stripping constants so obtained were then used to correct the natural gamma radiation counts obtained in earth formations for the effect of radiation from one element on measurements of radiation from other elements.

SUMMARY OF INVENTION

Briefly, the present invention provides a new and improved method of natural gamma ray logging of subsurface formations adjacent a well borehole. A sonde containing a gamma ray energy detector is moved to positions adjacent formations of interest by means of a logging cable. Natural gamma radiation from the formation is measured in four separate energy windows: a first, containing the 2.61 MeV thorium (Tl$^{208}$) energy peak; a second, containing the 1.76 MeV uranium (Bi$^{214}$) energy peak; a third, containing the 1.46 MeV potassium (K$^{40}$) energy peak; and a fourth, at a level below the third. From the gamma radiation measured in the four energy windows, a compensating function indicative of the effects of borehole conditions on the gamma radiation measured is obtained.

As used in the present invention, the term borehole conditions includes, for example, the density and effective thickness of intervening materials such as borehole fluid, casing, cement and rock matrix between the detector in the sonde and the source of natural gamma radiation in the formation. Applicants have found that variations in borehole conditions from those of the test formation samples in which the stripping constants were obtained can introduce errors in elemental concentration readings approaching an order of magnitude.

DESCRIPTION OF PREFERRED EMBODIMENT

THE LOGGING SYSTEM

Figure 1:
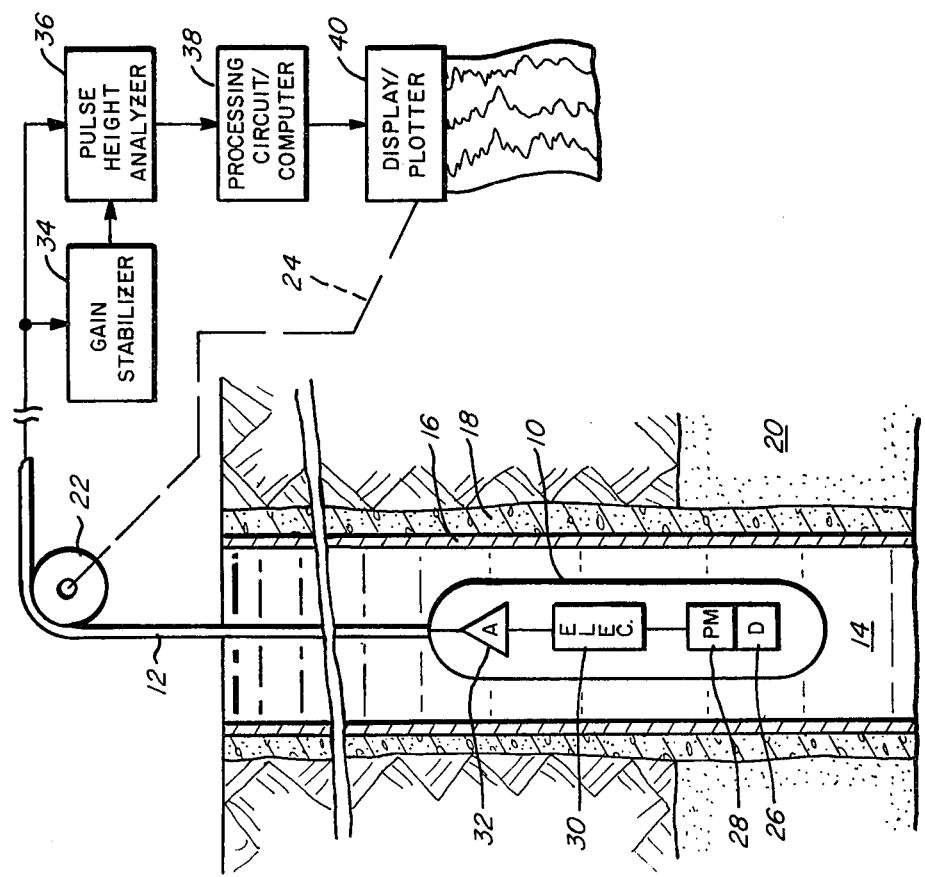
FIG. 1 is a schematic diagram of a natural gamma radiation logging system of the present invention in a well borehole.

In the drawings, a natural gamma ray logging system in accordance with the present invention is shown in FIG. 1. A sonde 10 of the gamma ray logging system is suspended by a logging cable 12 in a well borehole 14. The borehole 14 is typically one surrounded by a casing 16 and cement 18 as shown in the drawings, although it may also be an uncased well borehole, if desired.

The sonde 10 is lowered into the borehole 14 and moved by the cable 12 to positions adjacent various formations of interest, such as one indicated by reference numeral 20. The cable 12 passes over a sheave wheel 22 which provides output indications (schematically indicated by dashed line 24) of the depth of the sonde 10 in the borehole 14.

A detector 26 is mounted in the sonde 10 to detect naturally occurring gamma radiation from the constituent elements of the formation 20. Detector 26 is one which emits light flashes when naturally occurring gamma radiation from constituent elements of the formation 20 passes therethrough. The detector 26 may be, for example, a NaI(Tl) detector.

The detector 26 is optically coupled to a photomultiplier tube 28 which forms electrical pulses when light flashes are emitted by the detector 26. Electrical pulses from the detector 26 are furnished through a suitable electronic processing circuit 30 for pulse shaping and the like. A driver amplifier 32 transmits the pulses from the processing circuit 30, representing gamma radiation detected in the detector 26, via the logging cable 12 to the surface. Power is furnished to the components in the sonde 10 by either a suitable conventional power supply within the sonde 10 or from the surface by conventional means over cable 12.

At the surface, the pulses sensed in detector 26 are provided after transmission by the cable 12 to a conventional gain stabilizer 34 and pulse height analyzer 36. The pulse height analyzer 36 may be a multi-channel analyzer or a suitable number of single channel analyzers set at appropriate energy windows. It should be understood that pulse height analyzer 36 may be mounted in the sonde 10, if desired. As will be set forth, pulse height analyzer 36 is according to the present invention set to count pulses representing natural gamma radiation in four distinct energy windows.

Pulse height analyzer 36 accumulates a running count of pulses sensed in the detector 26 in each of the four assigned energy windows. Signals from the pulse height analyzer 36 representing the accumulated counts in each of the four energy windows are furnished to a processing circuit 38 which processes the counts presented thereto in a manner to be set forth. The circuit 38 may be a special purpose digital processing circuit or a programmed general purpose computer or microprocessor, as desired. The results obtained in the processing circuit 38 are displayed as a function of borehole depth on a recorder/displayer 40.

With the present invention, applicants have found that changes in borehole conditions from those of the test formation in which the stripping constants were obtained can introduce errors in measured concentration levels approaching an order of magnitude. As used in the present invention, the term borehole conditions includes, for example, the density and effective thickness of each intervening material, such as borehole fluid, casing, cement and the rock matrix, between the detector 22 in the sonde 10 and the source of natural gamma radiation in the formation 16.

Figure 2:
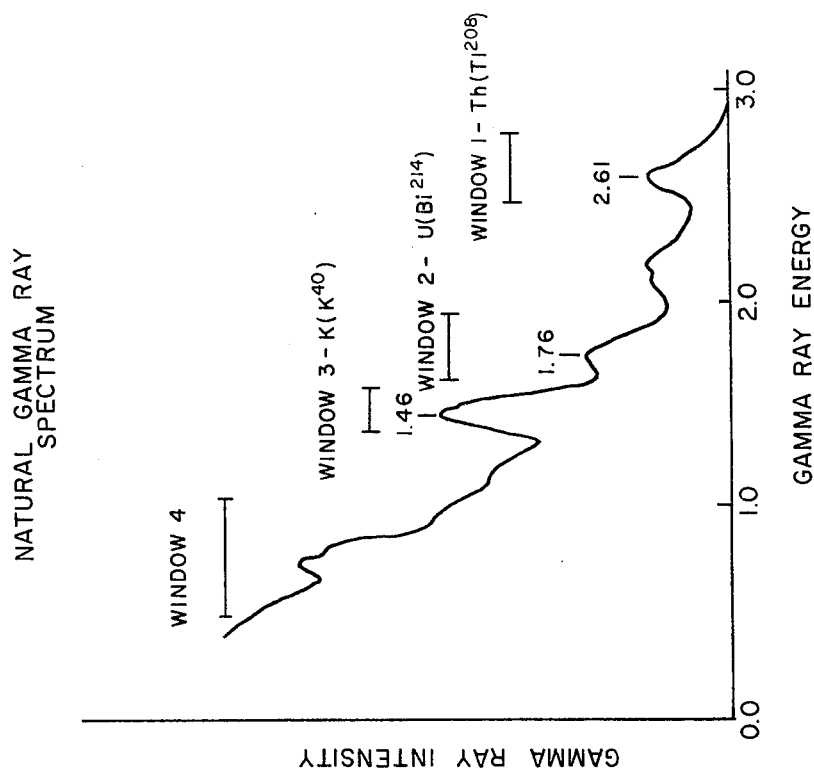
FIG. 2 is an example of a natural gamma ray spectrum from a subsurface formation.

Thus, in accordance with the present invention, natural gamma radiation from the formation 16 is detected by the detector 22 and pulses are stored in the pulse-analyzer 34 so that natural gamma radiation is measured in each of the four energy windows. The first energy window, labeled window 1 (FIG. 2), includes the 2.61 MeV thorium (Tl$^{208}$) natural gamma radiation energy peak. The second energy window, labeled window 2, includes the 1.76 uranium (Bl$^{214}$) natural gamma radiation uranium energy peak. The third energy window, window 3, includes the 1.46 potassium (K$^{40}$) natural gamma radiation potassium energy peak. The fourth window, window 4 is at an energy level preferably below the 1.46 MeV potassium energy peak. This fourth window, window 4, is at an energy level below the 1.46 MeV potassium energy peak. It is desirable, although not essential, to set window 4 below window 3. This is because variations in the shape of the spectrum due to changes in borehole conditions are most strongly reflected in the lower energy region of the gamma ray spectrum. Windows 1, 2 and 3 encompass their respective natural gamma radiation energy peaks set forth above, and with window 4 set preferably below window 3, any suitable bias may be set for the four energy windows in pulse height analyzer 36. The four energy windows may, if desired, overlap with one or more others. Each energy window must, however, be different in part from the other three. Pulse height analyzer 36 thus stores measured counting rates for formations of interest in a well field borehole under investigation for each of these four energy windows. If desired, more than four energy windows may be used as well.

PHYSICAL PRINCIPLES INVOLVED

The total count rate $C_i(\eta)$ recorded in each window i of energy windows 1 through 4 can be expressed as $$C_1(\eta) = C_{1T}(\eta) \tag{1}$$

$$C_2(\eta) = C_{2U}(\eta) + K_1 L(\eta) C_{1T}(\eta) \tag{2}$$

$$C_3(\eta) = C_{3K}(\eta) + K_2 L(\eta) C_{1T}(\eta) + K_3 L(\eta) C_{2U}(\eta) \tag{3}$$

$$C_4(\eta) = K_4 L(\eta) C_{1T}(\eta) + K_5 L(\eta) C_{2U}(\eta) + K_6 L(\eta) C_{3K}(\eta) \tag{4}$$

where $C_{ij}$ = the count rate contributed to window i from the decay of element j (j = T(Th), U, K)

$$\eta = \sum_k \rho_k x_k,$$

where $\rho_k x_k$ are the density and effective thickness, respectively, of borehole materials k such as borehole fluid, casing, cement, and rock matrix located between the detector 26 in the sonde 10 and the source of radiation in the formation 20.

The six stripping constants K in Equations (2), (3) and (4) above are as follows:

$$K_1 = C_{2T}(\eta_s)/C_{1T}(\eta_s) \tag{5}$$

$$K_2 = C_{3T}(\eta_s)/C_{1T}(\eta_s) \tag{6}$$

$$K_3 = C_{3U}(\eta_2)/C_{2U}(\eta_s) \tag{7}$$

$$K_4 = C_{4T}(\eta_s)/C_{1T}(\eta_s) \tag{8}$$

$$K_5 = C_{4U}(\eta_s)/C_{2U}(\eta_s) \tag{9}$$

$$K_6 = C_{4K}(\eta_s)/C_{3K}(\eta_s) \tag{10}$$

where the count rates $C_{ij}(\eta_s)$ are measured in calibration formations according to the prior art containing single elements j with a standard borehole and formation parameter $\eta_s$.

The term $L(\eta)$ is a multiplicative correction determined according to the present invention and applied to the six stripping constants $K_i$ (i = 1, . . . 6). It should be recalled that the stripping constants are measured under standard borehole and formation conditions $\eta_s$. In situations where borehole conditions differ from the standard conditions, so that $\eta \neq \eta_s$, the product $L(\eta) K_j$ yields a more proper and more accurate stripping constant than the prior art. Conversely, if and when $\eta = \eta_s$, $L(\eta) = 1$. Applicants have determined that $L(\eta)$ can be approximated by an equation of the form $$L(\eta) = a + b\eta \tag{11}$$

over a range of $\eta$ normally encountered.

The coefficients a and b are experimentally determined by selectively varying borehole conditions in the test formations and measuring the effect of the variation in borehole condition on the natural gamma radiation readings obtained from the known elemental concentrations. For example, readings may be taken in the test formations in both a cased and an uncased condition; with various thicknesses of casing in the formation; with various thicknesses of cement for the casing; and with various densities of borehole fluid. From these readings, the coefficients a and b are then determined.

The six stripping constants $K_i$ and the coefficients a and b are thus available from experimental determinations in the calibration formations in controlled conditions. The measured count rates obtained in energy windows 1, 2, 3 and 4 in the field borehole formation under investigation are stored in the pulse height analyzer 36, as has been set forth. Substituting Equation (11) into equations (1), (2), (3) and (4) thus yields a set of four equations containing four unknown quantities—$C_{1T}$, $C_{2U}$, $C_{3K}$ and $\eta$. Processor/computer 38 is thus used to simultaneously solve these four equations and determine the four unknown quantities for the formations of interest in the vicinity of the borehole 14.

The three computed count rate quantities $C_{ij}$ are related to the elemental concentrations, $M_j$, through the equations $$M_T = B(\eta) C_{1T}/Q_T \tag{12}$$

$$M_U = B(\eta) C_{2U}/Q_U \tag{13}$$

$$M_K = B(\eta) C_{3K}/Q_K \tag{14}$$

where $Q_j$ is calibration constant, again measured under standard test facility conditions ($\eta = \eta_s$), relating stripped counting rate to concentration of element j. $B(\eta)$ is a multiplicative correction factor of the present invention for the calibration constants $Q_j$ for situations normally encountered in field conditions in which $\eta \neq \eta_s$.

Applicants have found that over a range of $\eta$ normally encountered, $B(\eta)$ can be approximated by an equation of the form $$B(\eta) \doteq c \cdot e^{d\eta + f\eta^2} \qquad (15)$$

The coefficients c, d, and f are dependent upon the standard $\eta_s$ used to determine $Q_j$, but, again, can be determined based on measurements made for various borehole conditions once the standard calibration facility has been established.

The elemental concentrations $M_j$ of interest from formations in the vicinity of the borehole are obtained in processor circuit 38 from equations (12), (13) and (14) using equation (15), the known quantities ($Q_j$(j=1,2,3), c, d, f), and previously computed quantities ($C_{1T}$, $C_{2U}$, $C_{3K}$, $\eta$).

The foregoing disclosure and description of the invention are illustrative and explanatory thereof and various changes in the size, shape and materials as well as in the details of the preferred embodiment may be made without departing from the spirit of the invention.

We claim:

1. A method of natural gamma ray logging of subsurface formations adjacent a well borehole with a detector in a sonde, while compensating for the effects of borehole conditions on the logging, comprising the steps of:
   (a) measuring natural gamma radiation from the formation in a first energy window containing the 2.61 MeV thorium energy peak;
   (b) measuring natural gamma radiation from the formation in a second energy window containing the 1.76 MeV uranium energy peak;
   (c) measuring natural gamma radiation from the formation in a third energy window containing the 1.46 MeV potassium energy peak;
   (d) measuring natural gamma radiation in the formation in a fourth energy window differing at least in part from the other three energy windows; and
   (e) obtaining from the gamma radiation measured in the four energy windows and stripping constants from calibration formations a compensating function indicative of the effects of borehole conditions on the gamma radiation measured;
   (f) adjusting the measured natural gamma radiation for different borehole conditions based on the compensating function.

2. The method of claim 1, further including the step of:
   displaying the compensating function as a function of depth in the borehole.

3. The method of claim 1, further including the step of:
   (a) obtaining a measure of elemental concentration of thorium based on natural gamma radiation measured in the energy windows;
   (b) obtaining a correction factor for borehole effects on the elemental concentration measure of thorium in the formation;
   (c) compensating the elemental concentration measure of thorium according to the correction factor.

4. The method of claim 3, further including the step of:
   displaying the compensated elemental concentration measure of thorium as a function of depth in the borehole.

5. The method of claim 1, further including the step of:
   (a) obtaining a measure of elemental concentration of uranium based on natural gamma radiation measured in the energy windows;
   (b) obtaining a correction factor for borehole effects on the elemental concentration measure of uranium in the formation; and
   (c) compensating the elemental concentration measure of uranium according to the correction factor.

6. The method of claim 5, further including the step of:
   displaying the compensated elemental concentration measure of uranium as a function of depth in the borehole.

7. The method of claim 1, further including the step of:
   (a) obtaining a measure of elemental concentration of potassium based on a natural gamma radiation measured in the energy windows;
   (b) obtaining a correction factor for borehole effects on the elemental concentration measure of potassium in the formation; and
   (c) compensating the elemental concentration measure of potassium according to the correction factor.

8. The method of claim 7, further including the step of:
   displaying the compensated elemental concentration measure of potassium as a function of depth in the borehole.

9. A method of natural gamma ray logging of subsurface formations adjacent a well borehole with a detector in a sonde, while compensating for the effects of borehole conditions on the logging, comprising the steps of:
   (a) measuring natural gamma radiation from the formation in a first energy window containing the 2.61 MeV thorium energy peak;
   (b) measuring natural gamma radiation from the formation in a second energy window containing the 1.76 MeV uranium energy peak;
   (c) measuring natural gamma radiation from the formation in a third energy window containing the 1.46 MeV potassium energy peak;
   (d) measuring natural gamma radiation in the formation in a fourth energy window differing at least in part from the other three energy windows; and
   (e) obtaining a measure of elemental concentration of thorium based on natural gamma radiation measured in the energy windows and stripping constants from calibration formations;
   (f) obtaining a correction factor for borehole effects on the elemental concentration measure of thorium in the formation;
   (g) compensating the elemental concentration measure of thorium according to the correction factor.

10. The method of claim 9, further including the step of:
    displaying the compensated elemental concentration measure of thorium as a function of depth in the borehole.

11. A method of natural gamma ray logging of subsurface formations adjacent a well borehole with a detector in a sonde, while compensating for the effects of borehole conditions on the logging, comprising the steps of:

(a) measuring natural gamma radiation from the formation in a first energy window containing the 2.61 MeV thorium energy peak;
(b) measuring natural gamma radiation from the formation in a second energy window containing the 1.76 MeV uranium energy peak;
(c) measuring natural gamma radiation from the formation in a third energy window containing the 1.46 MeV potassium energy peak;
(d) measuring natural gamma radiation in the formation in a fourth energy window differing at least in part from the other three energy windows; and
(e) obtaining a measure of elemental concentration of uranium based on natural gamma radiation measured in the energy windows;
(f) obtaining a correction factor for borehole effects on the elemental concentration measure of uranium in the formation; and
(g) compensating the elemental concentration measure of uranium according to the correction factor.

12. The method of claim 11, further including the step of:
    displaying the compensated elemental concentration measure of uranium as a function of depth in the borehole.

13. A method of natural gamma ray logging of subsurface formations adjacent a well borehole with a detector in a sonde, while compensating for the effects of borehole conditions on the logging, comprising the steps of:
    (a) measuring natural gamma radiation from the formation in a first energy window containing the 2.61 MeV thorium energy peak;
    (b) measuring natural gamma radiation from the formation in a second energy window containing the 1.76 MeV uranium energy peak;
    (c) measuring natural gamma radiation from the formation in a third energy window containing the 1.46 MeV potassium energy peak;
    (d) measuring natural gamma radiation in the formation in a fourth energy window differing at least in part from the other three energy windows; and
    (e) obtaining a measure of elemental concentration or potassium based on a natural gamma radiation measured in the energy windows;
    (f) obtaining a correction factor for borehole effects on the elemental concentration measure of potassium in the formation; and
    (g) compensating the elemental concentration measure of potassium according to the correction factor.

14. The method of claim 13, further including the step of:
    displaying the compensated elemental concentration measure of potassium as a function of depth in the borehole.

* * * * *